United States Patent
Bouhour et al.

(10) Patent No.: US 9,739,315 B2
(45) Date of Patent: Aug. 22, 2017

(54) BOOT PROTECTING THE MALE AND FEMALE ELEMENTS OF A TRANSMISSION JOINT AND TRANSMISSION JOINT EQUIPPED WITH SUCH A PROTECTIVE BOOT

(71) Applicant: TRELLEBORG BOOTS FRANCE, Carquefou (FR)

(72) Inventors: Jean-Luc Bouhour, La Haye Fouassiere (FR); Frederic Maitay, Rialle (FR); Sebastien Daheron, Saint Andre 13 Voies (FR)

(73) Assignee: TRELLEBORG BOOTS FRANCE, Carequefou (FR)

( * ) Notice: Subject to any disclaimer, the term of this patent is extended or adjusted under 35 U.S.C. 154(b) by 37 days.

(21) Appl. No.: 14/777,113

(22) PCT Filed: Feb. 25, 2014

(86) PCT No.: PCT/FR2014/050402
§ 371 (c)(1),
(2) Date: Sep. 15, 2015

(87) PCT Pub. No.: WO2014/140442
PCT Pub. Date: Sep. 18, 2014

(65) Prior Publication Data
US 2016/0025148 A1    Jan. 28, 2016

(30) Foreign Application Priority Data
Mar. 15, 2013 (FR) ...................................... 13 52309

(51) Int. Cl.
*F16D 3/205* (2006.01)
*F16D 3/84* (2006.01)

(52) U.S. Cl.
CPC .......... *F16D 3/2055* (2013.01); *F16D 3/845* (2013.01); *Y10S 464/905* (2013.01)

(58) Field of Classification Search
CPC ..... F16D 3/2055; F16D 3/845; Y10S 464/905
(Continued)

(56) References Cited

U.S. PATENT DOCUMENTS 4,196,598 A * 4/1980 Hirai ................... F16D 3/2055
464/111
4,504,245 A * 3/1985 Orain ................... F16D 3/2055
(Continued)

FOREIGN PATENT DOCUMENTS

DE    29 27 648 A1    1/1981
EP    0 791 150 B1    8/1997

OTHER PUBLICATIONS

International Search Report, dated Dec. 9, 2014, from corresponding PCT application.

*Primary Examiner* — Gregory Binda
(74) *Attorney, Agent, or Firm* — Ipsilon USA, LLP

(57) ABSTRACT

A boot for protecting the male and female elements of a transmission joint, one element is formed by a transmission shaft having radial arms for carrying rollers, the other is formed by a bell housing suitable for at least partially receiving the rollers suitable to be inserted into the bell housing's open end, the boot, has an elongate hollow body enabling the shaft to pass there through, with a "first" one of its ends suitable for being secured to the shaft, and its "second" end suitable for being positioned in overlapping and interfitting manner over the bell housing's open end. This boot has an internal peripheral shoulder, whose surface that faces towards the second end of the boot is provided with at least two recesses which open towards the second end, the inside of each recess forming a seat having a (Continued)

concave bearing surface for receiving a roller in thrusting contact.

11 Claims, 4 Drawing Sheets

(58) Field of Classification Search
USPC ............. 464/111, 123, 124, 173–175, 905
See application file for complete search history.

(56) References Cited

U.S. PATENT DOCUMENTS

| | | |
|---|---|---|
| 5,879,238 A | 3/1999 | Breheret |
| 2006/0133888 A1 | 6/2006 | Sueoka et al. |

\* cited by examiner

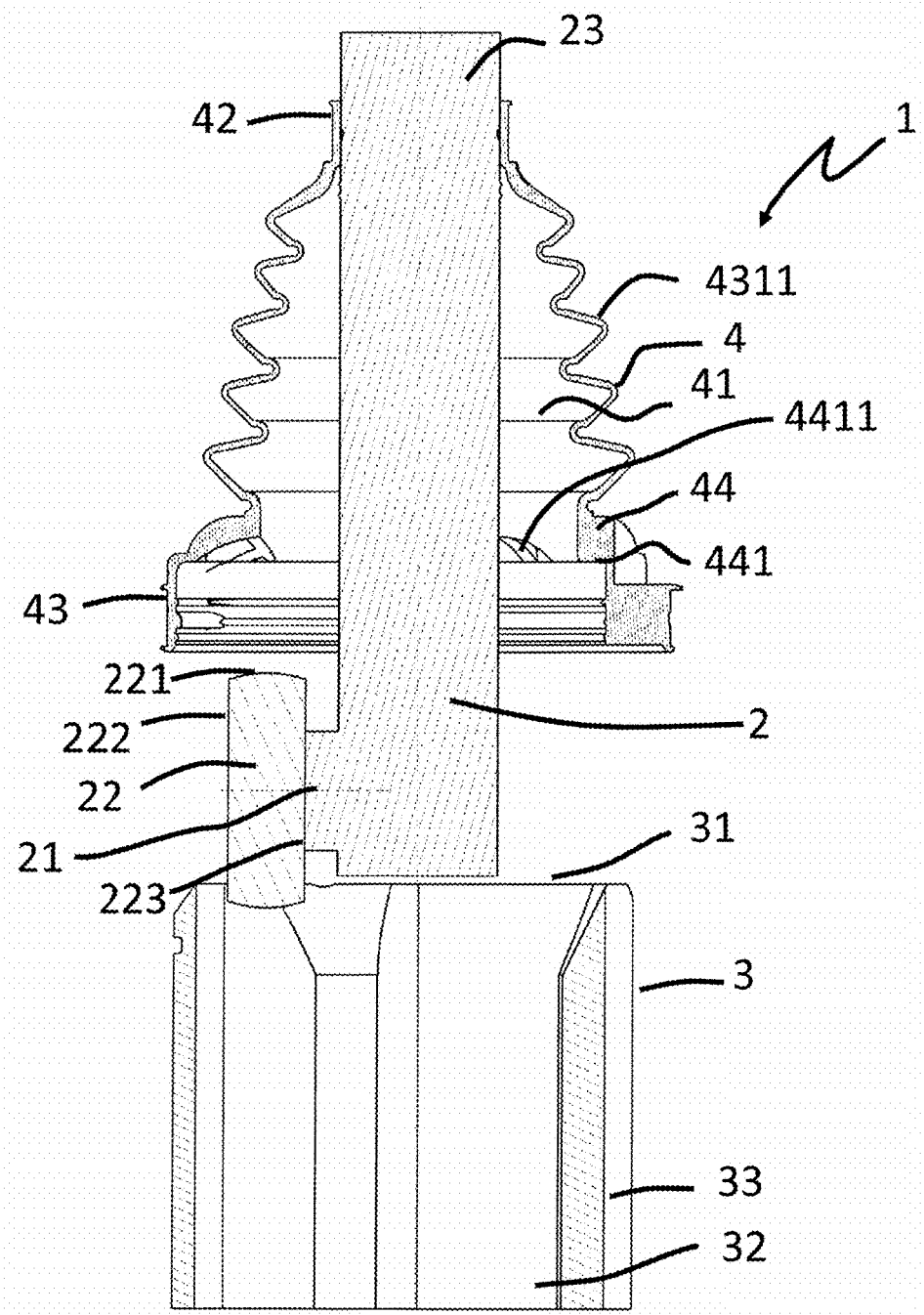

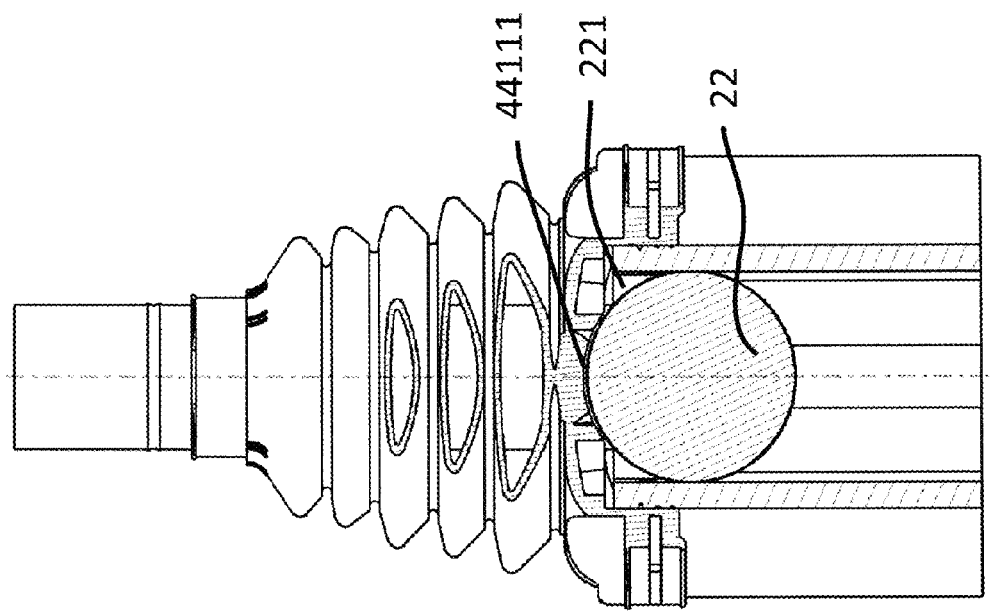
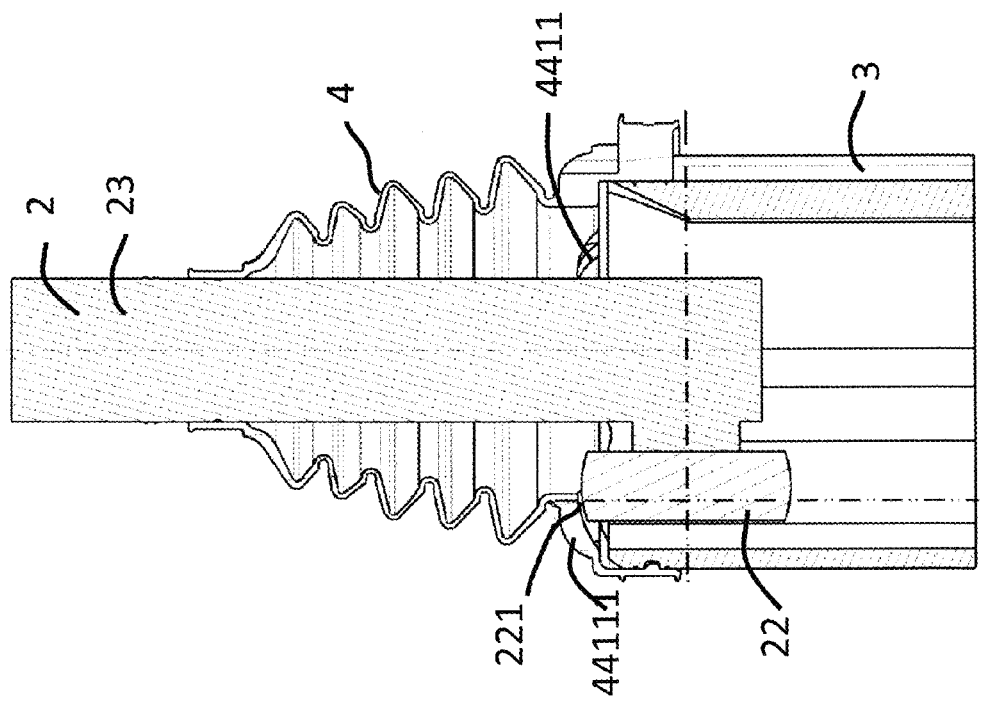

BOOT PROTECTING THE MALE AND FEMALE ELEMENTS OF A TRANSMISSION JOINT AND TRANSMISSION JOINT EQUIPPED WITH SUCH A PROTECTIVE BOOT

BACKGROUND

Field of the Invention

The present invention relates to a bellows-type protective "boot" or "gaiter" for protecting the male and female elements of a transmission joint, and it also relates to a transmission joint equipped with such a protective boot.

The present invention relates more particularly to a protective boot for protecting the male element and the female element of a transmission joint, one of which elements is formed by a transmission shaft having radial arms for carrying rollers, and the other of which elements, also known as a "tulip" or as a "bowl" or "socket", is formed by a bell housing suitable for at least partially receiving said rollers, which are suitable for being inserted into the bell housing via the open end of said bell housing, said boot, which is in the form of an elongate hollow body suitable for enabling said shaft to pass through it, having a "first" one of its ends suitable for being secured to said shaft, and having its "second" other one of its ends suitable for being positioned in overlapping and interfitting manner over the open end of the bell housing, said boot having an internal peripheral shoulder.

Description of Related Art

It is conventional to use a "constant-velocity" joint as a power transmission element for transmitting rotary drive power from a drive shaft of a vehicle to the wheels of said vehicle.

In motor vehicles, for example, between the gearbox and each wheel of the vehicle, a transmission is provided that is made up of two shafts interconnected by a mechanical transmission member that requires lubrication. Generally, the shaft coming from the gearbox is equipped with a tulip that constitutes the female element of the transmission member connecting that first shaft to the second transmission shaft. The female element is in the form of a generally three-lobed cavity. The lobes thus define recesses, each of which is, for example, designed to receive a respective roller. Each roller is carried by a male element that has three roller spindles. The male element is itself coupled to the second transmission shaft. A protective boot for protecting such a "tripod" or "spider" constant-velocity joint of the above-described type can have a cylindro-conical boot that, at one end, has a poly-lobed large base that, in the assembled state, presses against the outside surface of the tulip or bowl of the joint. The large base thus has an inside surface of shape complementary to the outside shape of the poly-lobed tulip. In the assembled state in which the boot is mounted on said tulip, a ring or collar surrounds the large base of the boot and is in the form of a circular surface that is concentric about the longitudinal axis of the boot so as to press the poly-lobed surface of said large base against the periphery of the tulip. The small base of the boot is fastened to the transmission shaft that is secured to the male element of the joint.

Joints are also known in which the male element is a shaft carrying balls for forming a ball bearing, as described in Patent EP-0 791 150. In such a joint, the boot has an internal radial shoulder formed integrally with the boot body. That shoulder forms a thrust surface preventing the balls from being dislodged from the boot during the assembly operations.

That phenomenon of it being possible for the rotary members carried by the shaft of the male element of the boot to escape can also be observed with shafts having arms for carrying rollers. However, since the rollers are suitable for coming directly into contact with said shoulder, there is a risk of said shoulder being deformed, thereby preventing the shaft having the arms for carrying the rollers from coming to a stop cleanly and immediately at the end of its assembly stroke when the rollers come into contact with said shoulder.

Finally, a protective boot of the above-mentioned type is known from Document DE-29 27 648 that constitutes the closest state of the art. In that document, the internal peripheral shoulder has an even surface in the circumferential direction and a curved profile in a radial direction so that each roller can roll freely in the circumferential direction along said shoulder without encountering any obstacles, such as recesses or projections, and, as a result, contact between the roller and the shoulder is at a point only, with, as a result, risks of the shoulder deforming.

OBJECTS AND SUMMARY

An object of the present invention is thus to propose a boot of the above-mentioned type that is of design making it possible to prevent the shaft having arms for carrying rollers from being dislodged from the boot during assembly, without giving rise to any deformation of the boot.

Another object of the present invention is to propose a boot that is of design making it possible to ensure that the shaft having the arms for carrying the rollers comes to a stop cleanly and immediately at the end of its assembly stroke inside the boot, without adversely affecting the length of said stroke.

To these ends, the invention provides a protective boot for protecting the male element and the female element of a transmission joint, one of which elements is formed by a transmission shaft having radial arms for carrying rollers, and the other of which elements, also known as a "tulip" or as a "bowl" or "socket", is formed by a bell housing suitable for at least partially receiving said rollers, which are suitable for being inserted into the bell housing via the open end of said bell housing, said boot, which is in the form of an elongate hollow body suitable for enabling said shaft to pass through it, having a "first" one of its ends suitable for being secured to said shaft, and having its "second" other one of its ends suitable for being positioned in overlapping and interfitting manner over the open end of the bell housing, said boot having an internal peripheral shoulder, said protective boot being characterized in that the surface of the shoulder that faces towards the second end of the boot is provided with at least two recesses that are open towards said second end, the inside of each recess forming a seat having a concave bearing surface suitable for receiving a roller in partially interfitting manner, and for forming a surface for receiving said roller in thrusting contact.

The risk of the boot deforming is reduced by the fact that the surface of the shoulder facing towards the second end of the boot is provided with recesses that are angularly offset and open towards said second end, and by the fact that each recess has an inside forming a seat with a concave bearing surface suitable for receiving a roller in partially interfitting manner. Since said bearing surface is suitable for forming a surface for receiving a roller, in particular via thrusting contact of the "rolling-bearing" outer peripheral surface of said roller, the contact between the roller and the shoulder takes place over an enlarged contact area instead of at a point, so the forces are distributed, thereby making it possible to reduce the risks of said shoulder of the boot deforming.

Preferably, the second end of the boot is defined by a poly-lobed wall, in which each lobe is formed by an internal radial bulge in said wall, a respective recess being disposed in each zone of the shoulder that extends between two lobes.

Preferably, at least one and preferably each of the recesses is open firstly towards the second end and secondly towards the inside of the boot.

Preferably, the bearing surface of the seat of at least one and preferably each of the recesses has a circularly arcuate curved profile in a circumferential direction.

Each recess therefore forms a cavity that, in the circumferential direction, and going from one its edges towards its opposite edge, has a depth that increases and then decreases. Said cavity is suitable for receiving the roller in partially interfitting manner. Thus, each roller is held in position inside its recess in the circumferential direction.

Preferably, the bearing surface of the seat of at least one and preferably each of the recesses has a curved profile in a radial direction with a recess depth that decreases going from the inside of the boot towards the outside of the boot. This shape of the bearing seat is chosen, in particular, when the rolling-bearing outer peripheral surface of the roller is a spherical annular surface.

Generally, between its first and second ends, the boot body has a plurality of corrugations about a common axis and that form the deformable portion of the boot that is deformable towards or away from said ends, said shoulder being disposed at the zone of interconnection between the deformable portion and the second end of the boot.

The invention also provides a transmission joint, in particular for a vehicle transmission, which joint is of the type comprising a male element formed by a transmission shaft having radial arms for carrying rollers, a female element that is also referred to as a "tulip", "bowl", or "socket" formed by a bell housing, and that, via its open end, covers said rollers at least partially, and a protective boot in the form of an elongate hollow body through which the shaft passes and having a "first" one of its ends suitable for being secured to said shaft and having the "second" other one of its ends suitable for being positioned in interfitting and overlapping manner over the open end of the bell housing, said transmission joint being characterized in that the boot is a boot of the above-mentioned type, and in that at least a portion of the roller and at least a portion of the bearing surface of the seat of the recess inside which said roller is suitable for being partially received having respectively convex and concave complementary shapes for enabling the roller to be received inside the recess in partially interfitting manner.

Preferably, with each roller having a front face, a rear face and a rolling-bearing outer peripheral surface interconnecting said faces, the portion of the roller that has a convex shape complementary to the shape of the bearing surface of the seat of the recess is formed by at least a portion of the rolling-bearing outer peripheral surface of the roller.

Preferably, with each roller having a front face, a rear face and a rolling-bearing outer peripheral surface interconnecting said faces, the bell housing of the female element has an end-wall and a side wall inscribed within a cylinder and that externally forms concave portions and convex portions in alternation, which portions are distributed angularly in uniform manner about the longitudinal axis of said cylinder, each convex portion, which is further away from the longitudinal axis of the cylinder than each concave portion, internally defining a pair of tracks facing which the rolling-bearing outer peripheral surface of a roller is suitable for moving, in the state in which the rollers are inserted at least partially into said bell housing.

Preferably, the second end of the boot is defined by a poly-lobed wall, in which each lobe, formed by an internal radial bulge in said wall, fits into a concave potion of the bell housing, in the state in which the boot is mounted in interfitting and overlapping manner over said bell housing, and each zone of the shoulder that extends between two lobes of the poly-lobed wall of the second end of the boot, and in which a recess is disposed, at least partially closes one end of the guide path formed by the pair of tracks of the bell housing, in the state in which the boot is mounted in at least partially overlapping manner over the male element and over the female element.

BRIEF DESCRIPTION OF THE DRAWINGS

The invention can be well understood on reading the following description of embodiments given with reference to the accompanying drawings, in which:

FIG. 3 is a fragmentary section view of a joint of the invention, with its component elements being shown in exploded manner;

FIG. 4A is a section view of a joint, with its elements being in the assembled-together state, in the assembly position;

FIG. 4B is a view seen from the left of FIG. 4A; and

DETAILED DESCRIPTION

Figure 1:
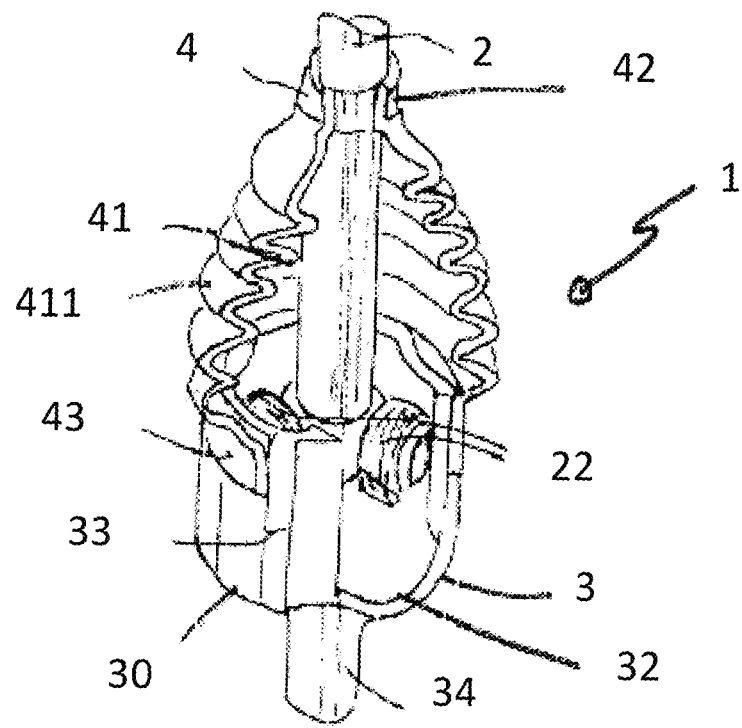
FIG. 1 is a fragmentary perspective view of a joint of the invention, a portion of said joint having been cut away so as to show the inside of the joint.
Figure 2:
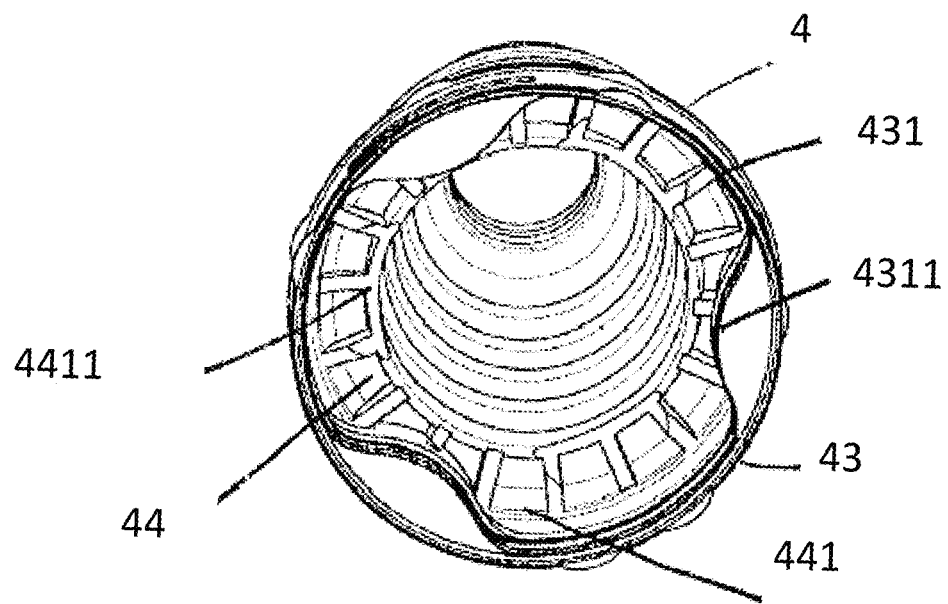
FIG. 2 is a perspective view of a bellows-type boot of the invention as seen from the second end of said boot.
Figure 5:
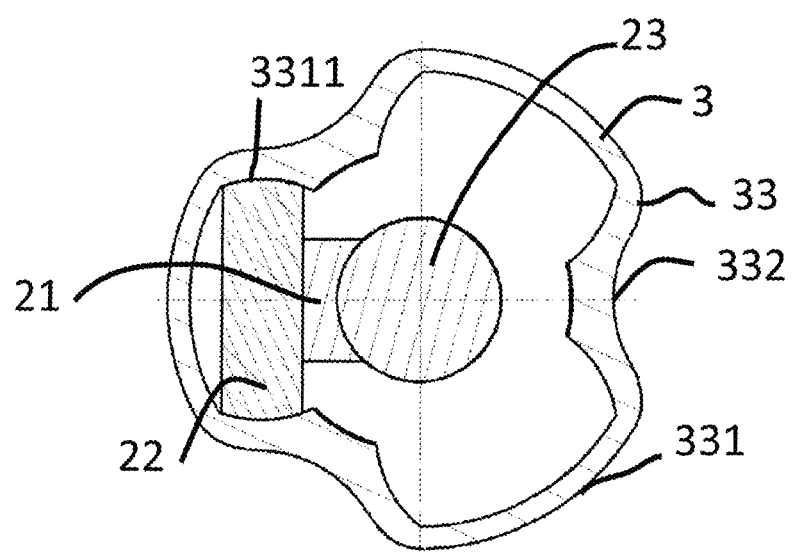
FIG. 5 is a horizontal section view of FIG. 4A.

As mentioned above, the invention relates to a bellows-type protective "boot" or "gaiter" 4 for protecting the male element 2 and the female element 3 of a constant-velocity joint 1, and the invention also relates to such a joint. For example, this joint makes it possible to transmit rotary motion from the shaft coming from the gearbox to the wheel shaft in a vehicle transmission. As mentioned above, the male element 2 is formed of a transmission shaft 23 having three radial arms 21 for carrying rollers 22. The three radial arms are distributed at 120° intervals about said shaft. Each radial arm carries a ring that is cylindrical in general shape and that is disposed inside the roller 22, and coupling means for coupling together the ring and the roller, which means are, in this example, formed by a set of needles disposed between the outside radial surface of the ring and the inside radial surface of the roller. The coupling means thus enable the roller and the ring to pivot about an axis of revolution that is common to the roller and to the ring, this axis corresponding to the longitudinal axis of said arm in this example.

Each roller 22 has a front face 222, a rear face 223, and a rolling-bearing outer peripheral surface 221 interconnecting said faces 222 and 223. The rear face 223 of the roller is the face of the roller that faces towards the shaft 23 having the arms 21 for carrying the rollers 22.

In the examples shown, the rolling-bearing outer peripheral surface 221 of the roller, that is radially outermost relative to the longitudinal axis of the arm carrying said roller or to the axis of revolution of the ring and of the roller 22, is a spherical annular convex surface that, when seen in cross-section, is circularly arcuate in shape, as shown in FIG. 4A.

The joint 1 also includes a female element 3. This female element 3 is in the form of a bell housing 30 suitable for receiving said rollers 22 at least in part, which rollers are suitable for being inserted into the bell housing 30 via the open end 31 of said bell housing 30.

In the example shown, this bell housing 30 is made of an end-wall 32 and of a side wall 33 inscribed within a cylinder and formed externally by concave portions 332 and convex portions 331 in alternation and uniformly angularly distributed about the longitudinal axis of said cylinder. In this example, said bell housing 30 is provided at its end-wall 32 with an external extension or "tail" shown at 34 in FIG. 1. This tail forms an extension of the shaft to which said joint is to be connected. Each convex portion 331 is further away from the longitudinal axis of the cylinder than each concave portion 332. Said convex portion 331 internally defines a pair of mutually facing tracks 3311, on which the rolling bearing outer peripheral surface 221 of a roller 22 is suitable for rolling, when the rollers 22 are in the state in which they inserted at least in part into said bell housing 30.

In the example shown, the bell housing 30 has three concave portions and three convex portions and three pairs of tracks. Each track is formed by a cylindrical surface portion of the peripheral side wall of the bell housing that is parallel to the longitudinal axis of the cylinder within which the peripheral side wall of the bell housing is inscribed. The cross-sectional shape of the track is the shape of an arc corresponding to the generator line of the roller.

The joint 1 also includes a protective boot 4 in the form of a part that is molded by injection-molding or otherwise. The protective boot 4 is made of a synthetic material. This protective boot 4 is in the form of an elongate hollow body 41 suitable for enabling the shaft 23 having the arms 21 for carrying the rollers 22 to pass through it. This hollow body 41 has a first end 42 that is suitable for being secured to the shaft 23 and a second end 43 that is suitable for being positioned in overlapping manner over the open end 31 of the bell housing 30. The boot 4 is also provided with an internal peripheral shoulder 44 formed by two radial inside surfaces and by one axial surface interconnecting the radial surfaces. The surface 441 of the shoulder 44 that faces towards the second end 43 of the boot, and that is a surface that is radial relative to said boot, is provided with three recesses 4411 that are open towards said second end 43. Each recess 4411 whose inside forms a seat 44111 having a concave bearing surface suitable for partially receiving a roller in interfitting manner. The concave bearing surface of said seat is thus suitable for forming a surface receiving the rolling-bearing outer peripheral surface of said roller in thrusting contact.

In the example shown, the second end 43 of the bellows 4 is defined by a three-lobed wall 431, each lobe 4311 of which is formed by an internal radial bulge in said wall 431. A recess 4411 is disposed in each zone of the shoulder 44 extending between two lobes 4311. The shoulder 44, and in particular the surface 441 of the shoulder 44 that faces towards the second end of the boot is thus provided with three recesses 4411 that are spaced apart angularly at intervals of 120°.

Each lobe 4311 of the three-lobed wall 431 of said second end 43 of the boot fits into a concave portion 332 of the bell housing 30 in the state in which the boot 4 is mounted in overlapping and interfitting manner over said bell housing 30.

In this configuration, each zone of the shoulder 44 that extends between two lobes 4311 of the three-lobed wall 431 of the second end 43 of the boot, and in which a recess 4411 is disposed, at least partially closes one end of the guide path formed by a pair of tracks 3311 of the bell housing 30, when the boot 4 is mounted in at least partially overlapping manner over the male and female elements.

Each of the recesses 4411 is open firstly towards the second end 43 of the boot 4, and secondly towards the inside of the boot 4.

The bearing surface of the seat of each recess has a circularly arcuate profile in a circumferential direction and in a radial direction with, in the radial direction, a recess depth that decreases going from the inside towards the outside of the boot. This shape is chosen as a function of the shape of rolling-bearing outer peripheral surface of the roller.

Between its first and second ends 42, 43, the boot body 41 also has a plurality of corrugations 411 sharing a common axis and forming the deformable portions of the boot that are deformable towards or away from said ends 42, 43. In this example, the corrugations are mutually parallel. The shoulder 44 is disposed at the zone of interconnection between the deformable portion and the second end 43 of the boot 4.

When assembling the joint, the male element 2 is inserted into the boot by inserting the shaft having the arms for carrying the rollers at the second end of the boot until it projects from the first end of the boot. The female element 3 is then fitted, and overlapped at the open end of the bell housing of the female element by the second end of the boot.

During this assembly, if the shaft having the arms for carrying the rollers comes, via its rollers, into thrusting contact with the surface of the shoulder of the boot that faces towards the second end, as shown in FIGS. 4A and 4B, said rollers thrust via their convex rolling-bearing outer peripheral surfaces against the concave bearing surfaces of the seats, which surfaces are formed by respective ones of the recesses in said shoulder. This contact over a large surface area limits any risk of the boot deforming at said shoulder and makes it possible for the roller to stop cleanly and immediately when the shaft having the arms for carrying the rollers moves axially into the boot from the second end of the boot towards the first end of the boot.

The invention claimed is:

1. A protective boot for protecting the male element and the female element of a transmission joint, said male element is formed by a transmission shaft having radial arms for carrying rollers, and said female element, also known as a tulip or as a bowl or socket, is formed by a bell housing for at least partially receiving said rollers, which are suitable for being inserted into the bell housing via an open end of said bell housing, said boot, which is in the form of an elongate hollow body enabling said shaft to pass through it, having a first end suitable for being secured to said shaft, and having a second end for being positioned in overlapping and interfitting manner over the open end of the bell housing, said boot comprising:

an internal peripheral shoulder, wherein the boot is a molded piece made of a synthetic material between its first and second ends, the boot body having a plurality of corrugations about a common axis and that form a deformable portion of the boot that is deformable towards or away from said ends, said shoulder being disposed at a zone of interconnection between the deformable portion and the second end of the boot, and wherein the surface of the shoulder that faces towards the second end of the boot is provided with at least two recesses that are open towards said second end, the inside of each recess forming a seat having a concave bearing surface that receives a roller in interfitting manner, and for forming a surface for receiving said roller in thrusting contact.

2. A boot according to claim 1, wherein the second end of the boot is defined by a poly-lobed wall, in which each lobe is formed by an internal radial bulge in said wall, a respective recess being disposed in each zone of the shoulder that extends between two lobes.

3. A boot according to claim 2, wherein the second end has three lobes and the shoulder has three recesses spaced apart angularly at intervals of 120.degree.

4. A boot according to claim 1, wherein at least one of the recesses is open firstly towards the second end and secondly towards the inside of the boot.

5. A boot according to claim 1, wherein the bearing surface of the seat of at least one of the recesses has a circularly arcuate curved profile in a circumferential direction.

6. A boot according to claim 1, wherein the bearing surface of the seat of at least one of the recesses has a curved profile in a radial direction with a recess depth that decreases going from the inside of the boot towards the outside of the boot.

7. A transmission joint for a vehicle transmission, said joint comprising:
a male element formed by a transmission shaft having radial arms for carrying rollers, a female element that is also referred to as a tulip or as a bowl or socket formed by a bell housing, and that, via its open end, covers said rollers at least partially, and
a protective boot in the form of an elongate hollow body through which the shaft passes and having a end for being secured to said shaft and having a second end for being positioned in interfitting and overlapping manner over an open end of the bell housing,
wherein the boot is a boot according to claim 1, and at least a portion of the roller and at least a portion of the bearing surface of the seat of the recess inside which said roller partially received, having respectively convex and concave complementary shapes for enabling the roller to be received inside the recess in partially interfitting manner.

8. A transmission joint according to claim 7, wherein with each roller having
a front face,
a rear face and
a rolling-bearing outer peripheral surface interconnecting said front and rear faces, the portion of the roller that has a convex shape complementary to the shape of the bearing surface of the seat of the recess is formed by at least a portion of the rolling-bearing outer peripheral surface of the roller.

9. A joint according to claim 8, wherein each roller has
a front face,
a rear face and
a rolling-bearing outer peripheral surface interconnecting said faces,
wherein the bell housing of the female element has an end-wall and a side wall inscribed within a cylinder and that externally forms concave portions and convex portions in alternation, which portions are distributed angularly in uniform manner about the longitudinal axis of said cylinder, each convex portion, which is further away from the longitudinal axis of the cylinder than each concave portion, internally defining a pair of tracks facing which the rolling-bearing outer peripheral surface of a roller for moving, in the state in which the rollers are inserted at least partially into said bell housing.

10. A joint according to claim 7, wherein each roller has
a front face,
a rear face and
a rolling-bearing outer peripheral surface interconnecting said front and rear faces, wherein the bell housing of the female element has an end-wall and a side wall inscribed within a cylinder and that externally forms concave portions and convex portions in alternation, which portions are distributed angularly in uniform manner about the longitudinal axis of said cylinder,
each convex portion, which is further away from the longitudinal axis of the cylinder than each concave portion, internally defining a pair of tracks facing which the rolling-bearing outer peripheral surface of a roller for moving, in the state in which the rollers are inserted at least partially into said bell housing.

11. A joint according to claim 10, wherein the second end of the boot is defined by a poly-lobed wall, in which each lobe, formed by an internal radial bulge in said wall, fits into a concave portion of the bell housing, in the state in which the boot is mounted in interfitting and overlapping manner over said bell housing, and each zone of the shoulder that extends between two lobes of the poly-lobed wall of the second end of the boot, and in which a recess is disposed, at least partially closes one end of the guide path formed by the pair of tracks of the bell housing, in the state in which the boot is mounted in at least partially overlapping manner over the male element and over the female element.

* * * * *